United States Patent
Ye et al.

(10) Patent No.: US 12,315,125 B2
(45) Date of Patent: May 27, 2025

(54) REAL TIME IMAGE CONVERTER USING 2D TO 3D RENDERING

(71) Applicant: Dell Products L.P., Round Rock, TX (US)

(72) Inventors: Qing Ye, Hopkinton, MA (US); Zhisong Liu, Shenzhen (CN); Rowland Shaw, Chester, NH (US)

(73) Assignee: Dell Products L.P., Round Rock, TX (US)

( * ) Notice: Subject to any disclaimer, the term of this patent is extended or adjusted under 35 U.S.C. 154(b) by 154 days.

(21) Appl. No.: 18/175,329

(22) Filed: Feb. 27, 2023

(65) Prior Publication Data

US 2024/0289932 A1    Aug. 29, 2024

(51) Int. Cl.
  *G06T 7/00* (2017.01)
  *G06T 17/00* (2006.01)
  *G06T 19/00* (2011.01)

(52) U.S. Cl.
  CPC ............ *G06T 7/0002* (2013.01); *G06T 17/00* (2013.01); *G06T 19/006* (2013.01); *G06T 2207/30184* (2013.01); *G06T 2219/024* (2013.01)

(58) Field of Classification Search
  None
  See application file for complete search history.

(56) References Cited

U.S. PATENT DOCUMENTS

| | | | | |
|---|---|---|---|---|
| 2004/0068187 A1* | 4/2004 | Krause | ............. | A61B 17/151 |
| | | | | 600/443 |
| 2017/0316608 A1* | 11/2017 | Khalid | .................. | G06F 3/011 |
| 2023/0267618 A1* | 8/2023 | Gogna | ................. | G16H 30/40 |
| | | | | 382/131 |

OTHER PUBLICATIONS

Szeliski, R. (2011). Structure from motion. In: Computer Vision. Texts in Computer Science. Springer, London. https://doi.org/10.1007/978-1-84882-935-0_7.
BIM Level of Development I LOD, 100, 200, 300, 350, 400, 500 I Best BIM service providers in USA (srinsofttech.com).
Parsons, J., ENR Engineering News-Record. Analysis Traces Mississippi River Bridge Beam Crack to Fabrication. https://www.enr.com/articles/52982-analysis-traces-mississippi-river-bridge-beam-crack-to-fabrication.
Patel, S., ComplexUK. Train Tracks In London Burst Into Flames Amid Rising Heatwave. https://www.complex.com/life/train-tracks-london-uk-heatwave.
NIST. Disaster & failure studies, Champlain Towers South Collapse. https://www.nist.gov/disaster-failure-studies/champlain-towers-south-collapse-ncst-investigation.
Lingjie Liu, Jiatao Gu, Kyaw Zaw Lin, Tat-Seng Chua, Christian Theobalt, Neural Sparse Voxel Fields, 34th Conference on Neural Information Processing Systems (NeurIPS 2020).

(Continued)

*Primary Examiner* — James A Thompson
*Assistant Examiner* — Kim Thanh T Tran
(74) *Attorney, Agent, or Firm* — Workman Nydegger (57) ABSTRACT

One example method includes obtaining a group of two dimensional images of a target, rendering, in real time immediately after the two dimensional images are obtained, a three dimensional model of the target, using the two dimensional images, and generating an output comprising the three dimensional model. The three dimensional model may then be compared with another version of the three dimensional model to identify a change in a condition of a structural element that is included in both of the three dimensional models.

20 Claims, 8 Drawing Sheets

(56) References Cited

OTHER PUBLICATIONS

Ben Mildenhall, Pratul P. Srinivasan, Matthew Tancik, Jonathan T. Barron, Ravi Ramamoorthi, and REN NG. 2021. NeRF: representing scenes as neural radiance fields for view synthesis. Commun. ACM 65, 1 (Jan. 2022), 99-106.

C. Reiser, S. Peng, Y. Liao and A. Geiger, "KiloNeRF: Speeding up Neural Radiance Fields with Thousands of Tiny MLPs," 2021 IEEE/CVF International Conference on Computer Vision (ICCV), 2021, pp. 14315-14325, doi: 10.1109/ICCV48922.2021.01407.

A. Yu, R. Li, M. Tancik, H. Li, R. Ng and A. Kanazawa, "PlenOctrees for Real-time Rendering of Neural Radiance Fields," 2021 IEEE/CVF International Conference on Computer Vision (ICCV), 2021, pp. 5732-5741, doi: 10.1109/ ICCV48922.2021.00570.

Weiping Song, Chence Shi, Zhiping Xiao, Zhijian Duan, Yewen Xu, Ming Zhang, and Jian Tang. 2019. AutoInt: Automatic Feature Interaction Learning via Self-Attentive Neural Networks. In <i>Proceedings of the 28th ACM International Conference on Information and Knowledge Management.

Liwen Wu, Jae Yong Lee, Anand Bhattad, Yu-Xiong Wang, David A. Forsyth: DIVeR: Real-time and Accurate Neural Radiance Fields with Deterministic Integration for Volume Rendering. CoRR abs/2111.10427 (2021).

S. J. Garbin, M. Kowalski, M. Johnson, J. Shotton and J. Valentin, "FastNeRF: High-Fidelity Neural Rendering at 200FPS," 2021 IEEE/CVF International Conference on Computer Vision (ICCV), 2021, pp. 14326-14335, doi: 10.1109/ICCV48922.2021.01408.

Wadhwani, Krishna and Kojima, Tamaki, SqueezeNeRF: Further factorized FastNeRF for memory-efficient inference, doi: 10.48550/ARXIV.2204.02585.

Thomas Müller, Alex Evans, Christoph Schied, Alexander Keller, Instant Neural Graphics Primitives with a Multiresolution Hash Encoding, ACM Transactions on Graphics (SIGGRAPH), Jul. 2022.

\* cited by examiner

| Method | PSNR (dB) ↑ | SSIM ↑ | Frame per second (FPS) ↑ | GPU memory (MB) ↓ | FLOPs ↓ | GPUs (Nvidia) |
|---|---|---|---|---|---|---|
| NeRF | 30.23 | 0.946 | 0.04 | 5 | 1056k | V100 |
| JAXNeRF | 30.55 | 0.952 | 0.01 | 12 | 1056k | RTX 2080 |
| NeRF-SH | 31.71 | 0.958 | 168 | 1900 | 0 | V100 |
| KiloNeRF | 31.00 | 0.920 | 50 | 160 | 12k | GTX 1080 Ti |
| AutoInt | 25.55 | 0.911 | 0.6 | 5 | 110k | V100 |
| DIVeR32 | 32.12 | 0.958 | 47 | 68 | 10k | GTX 1080 Ti |
| FastNeRF (no-cache) | 29.16 | 0.936 | 0.03 | 28 | 1023k | RTX 3090 |
| FastNeRF (1K Cache) | 29.97 | 0.941 | 172 | 16200 | 2.3k | RTX 3090 |
| SqueezeNeRF (no-cache) | 29.59 | 0.931 | 0.02 | 11 | 997k | Nvidia V100 |
| SqueezeNeRF | 29.61 | 0.921 | 165 | 155 | 3.1k | Nvidia V100 |
| Instant-NGP | 33.18 | 0.962 | 6.7 | 3072 | - | RTX 3090 |

——— t0 = CAD FILE STRUCTURE AT INSTALLATION

▨ t1 = 6-MONTH EXTENSION  ▨ t2 = 12-MONTH EXTENSION  ▨ t3 = 18-MONTH EXTENSION

REAL TIME IMAGE CONVERTER USING 2D TO 3D RENDERING

FIELD OF THE INVENTION

Embodiments of the present invention generally relate to image generation. More particularly, at least some embodiments of the invention relate to systems, hardware, software, computer-readable media, and methods, for real time rendering of two dimensional images into a three dimensional image.

BACKGROUND

Various approaches have been devised for digital image conversion. For example, Matterport transforms photographs of a space into BIM (building information modeling) or CAD (computer aided drafting) files to reconstruct a digital three dimensional (3D) space for viewing or other purposes. Thus, the reconstructed 3D model may be an approximation, such as at BIM LoD (Level of Development) 200-300, of the space that was photographed. However, such a model only indicates the structural configuration of the space from a design point of view, rather than reflecting real world condition such as cracked surfaces, deformations, deteriorating portions, and other conditions. It is noted here that LOD is an industry standard that defines various levels of refinement at which the 3D geometry of the building model can be rendered, and is used as a measure of the service level required.

Approaches such as those just described may be relatively time-consuming. For example, file conversion and BIM reconstruction services typically take about 24 hours, to as long as a few days, depending on considerations such as the size of the space that was photographed.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 5b discloses an example of how various 2D images may be captured of the structures in FIG. 5a.

DETAILED DESCRIPTION OF SOME EXAMPLE EMBODIMENTS

Embodiments of the present invention generally relate to image generations. More particularly, at least some embodiments of the invention relate to systems, hardware, software, computer-readable media, and methods, for real time rendering of two dimensional images into a three dimensional image.

One embodiment of the invention comprises a method that uses a real time image converter, which may be located in a far edge environment, that may collaborate with a data orchestration system at a near edge, or core, environment, to enhance the accuracy, speed and cost-savings for multiple use cases, such as remote inspection and immersive experience sharing, for example.

At a device level, a portable image converter, which may be implemented in an edge computing device, may be deployed in an edge environment and may comprise a still camera and/or video camera for image capture, and/or a user may access images and/or videos sourced from drones, AR (Augmented reality) goggles, a smartphone, webcams, or surveillance cameras on nearby structures, for example. The scope of the invention is not limited to any particular form factor(s) for a portable image converter however, and the foregoing are provided only by way of example.

In an embodiment, a portable image converter may serve as a local compute engine for real time 2D to 3D rendering, and may further comprise a local storage for historical data, and one or more existing 3D models, in order to be able to deliver accurate and fast conclusions based on the outcome of a 2D-3D rendering process. Based on the comparison of a rendered 3D image with prior conditions, a green, yellow, or red, status may be indicated immediately, where 'immediately' may embrace a short period of time, possibly less than 10 seconds after completion of the comparison for example. The status indicator may serve as a guide to what further action(s), if any, are required based on the 3D image that has been rendered of the site.

At a system level, one or more 2D images of an initial, or other, condition of, for example, subjects such as a man-made structure such as a building, or a natural feature, such as a mountain, may be used to render a 3D model of the building or natural feature, possibly, but not necessarily, in real time, as a baseline dataset, that is, a 3D model. Additional 2D images may be collected over time to generate one or more additional 3D models that may then be compared with the baseline 3D model and/or with each other to detect conditions, changed conditions, and trends, in the subject for which the 2D images were captures. The condition and trend information may be used to inform progressive analytics and predictive maintenance based on changes observed over time. The repository of 3D models may significantly reduce the demand for computing power for onsite rendering as high resolution rendering may only be needed for the delta areas, that is, areas of particular interest, such as where changes are noted, and/or expected, to be occurring. This tiered computing approach may help to conserve energy and/or conserve the limited computing resources at the portable image converter. Embodiments may be employed in various enterprise, and consumer, use cases, and the use cases disclosed herein are solely for the purposes of illustration, and are not intended to limit the scope of the invention in any way.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that 3D images of features of interest may be generated in real time as the 2D images used to generate the 3D image are captured. An embodiment may generate 3D images in environments with limited computing resources. An embodiment may provide structural and other information concerning physical environments that are difficult, or impossible, for a human to access. An embodiment may enable a content creator to share an immersive 3D experience using 2D images. Various other advantages of one or more embodiments of the invention will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

In general, one or more embodiments of the invention may comprise one or more small form factor image conversion devices, possibly operating in a far edge computing environment, that perform real-time 2D to 3D rendering, and 3D model comparison, to support conclusions as to whether, and what, action(s) may need to be taken concerning the subject(s) from which the 3D model(s) were generated. These operations may be performed onsite where the subject is located. Such small form factor image conversion devices, which may be implemented as edge computing devices, may comprise autonomous vehicles such as drones and UAVs (unmanned autonomous vehicle), robots, semi-autonomous, or non-autonomous, vehicles controllable in whole or in part by way of human commands transmitted by way of a user interface (UI), portable computing devices such as tablets, smartphones, and laptops, and any other systems and devices, which may comprise hardware and/or software, that are configured to capture 2D images, which may comprise still and/or video, and to convert one or more of the 2D images, which may be digital and/or analog, to a portion of, or an entire, 3D digital model.

More generally, the scope of the invention is not limited to any particular image conversion device. Note further that an image conversion device may, or may not, also comprise an image capturing device such as a camera for example. In an embodiment, an image conversion device may omit an image capturing device, but may be configured to obtain images from image capturing devices that are located elsewhere, that is, other than at the image conversion device.

In one particular, and non-limiting example, an image conversion device may comprise a variety of components including, but not limited to: one or more cameras, and/or images captured by a drone, smart phone, infrared camera, or other image capturing devices; a 2D-to-3D rendering module; data storage; a comparison module, which may be optional, for example, in a consumer use case; a dataflow and output controller; a wireless communication connection and associated hardware and software, such as, for example, a WiFi connection, cellular connection, or satellite connection; a small graphical display; a speaker; a microphone; and, a file compressor.

An embodiment may further comprise a central system at near edge location/environment, or core location/environment, to host 2D images gathered by image conversion devices and/or other entities. The central system may also store 3D models, and original design files for regulatory compliance. In an embodiment, the central system may perform various functions, such as, but not limited to, to training AI/ML (artificial intelligence/machine learning) algorithms to predict changes with time, integrating with environmental sensor data to root cause the failure, issuing policy or protocols for emergency response, scheduling tasks for each target, and dispatching associated or required prior models, such as may be used as references, by one or more far edge devices, ahead of the tasks in order to reduce rendering time and energy, and fully enable, and employ, the real-time compute and processing power of onsite devices, that is, the edge devices.

B. General Aspects of Some Example Embodiments

One or more embodiments may possess various useful features and advantages, examples of which are discussed hereafter. For example, a portable image converter according to an embodiment may provide accuracy, convenience, efficiency, and sustainability to daily jobs of many auditors and inspection engineers, by implementing 2D to 3D real time rendering at far edge. This approach may eliminate unnecessary physical travel of people to sites of interest, and may reduce or eliminate the need for movement of large amounts of data from the site to the core for processing. The scheduled rendering of 3D at an edge device may require relatively less compute power, as one or more 3D reference models may be pushed out to, or pulled by, the edge device, thus eliminating the need for the edge device to generate the reference models itself. For environments with large scale, real time, rendering needs, the use of 3D reference models may save significant computing resources, reduce latency between the edge and the core, reduce required communication bandwidth between the edge and the core, and provide 3D models to the core relatively more quickly.

As another example, a portable image converter may provide millions of content creators the capability of sharing real-time immersive experiences by linking physical and virtual worlds. The immersive experience may be shared with users.

In an embodiment, the automatic comparison of the real-time rendered 3D model with the design files or prior reference models, which may be spatial or thermal for example, may provide quick insights as to aspects of a component or an area of the target that is out of specification. This information may be useful for designers, engineers, and maintenance personnel, regulation auditors, or quality assurance inspectors, for example.

In an embodiment, the ongoing accumulation of real world 3D models may be used to continuously update a model repository. The models in the model repository may be used for various purposes such as, for example, to monitor the health of the target, measure material behavior, predict trends assisted by AI/DL, detect anomalies, identify root cause(s) of an observed deformation or other anomaly, such as may be due to improper installation, defective materials, and/or unexpected environmental factors, and to alert stakeholders for early intervention to prevent catastrophic failures and/or for the taking of other actions.

Further, in an embodiment, the collaboration of one or more portable image converters with a central scheduling system may enable the automatic dispatch of the relevant prior, or reference, model(s) to the tasked devices to speed up rendering and comparison of 3D models by the device, and may thus eliminate any need for the device to search for, and obtain, the relevant 3D reference model(s). Thus, for example, a 3D reference model may be staged at a device before the 3D reference model is needed, so that comparisons with the 3D reference model may be performed immediately after a 3D model is generated by the device.

As a final example of features and aspects of an embodiment, a method according to one embodiment may comprise two operational modes, namely, a coarse mode with low resolution rendering, and fine mode with relatively higher resolution rendering than the coarse mode. In an embodiment, the coarse mode could be the primary, or default, mode to enable a relatively faster scan, that is, 2D image capture, than would be possible in the fine mode. Upon detection of an actual, or suspected, anomaly, which may be determined by 3D model comparison for example, the mode may automatically switch from coarse mode to fine mode to reveal more details about the anomaly and related aspects of the target. The operational modes of an embodiment may also comprise, or be integrated with, other techniques such as, for example, IR heatmap modeling techniques, to provide additional functionalities, such as determining a heat signature, and heat distribution, such as may be indicated by thermoclines, of a target.

C. Detailed Description

C.1 Example Architecture

Figure 1:
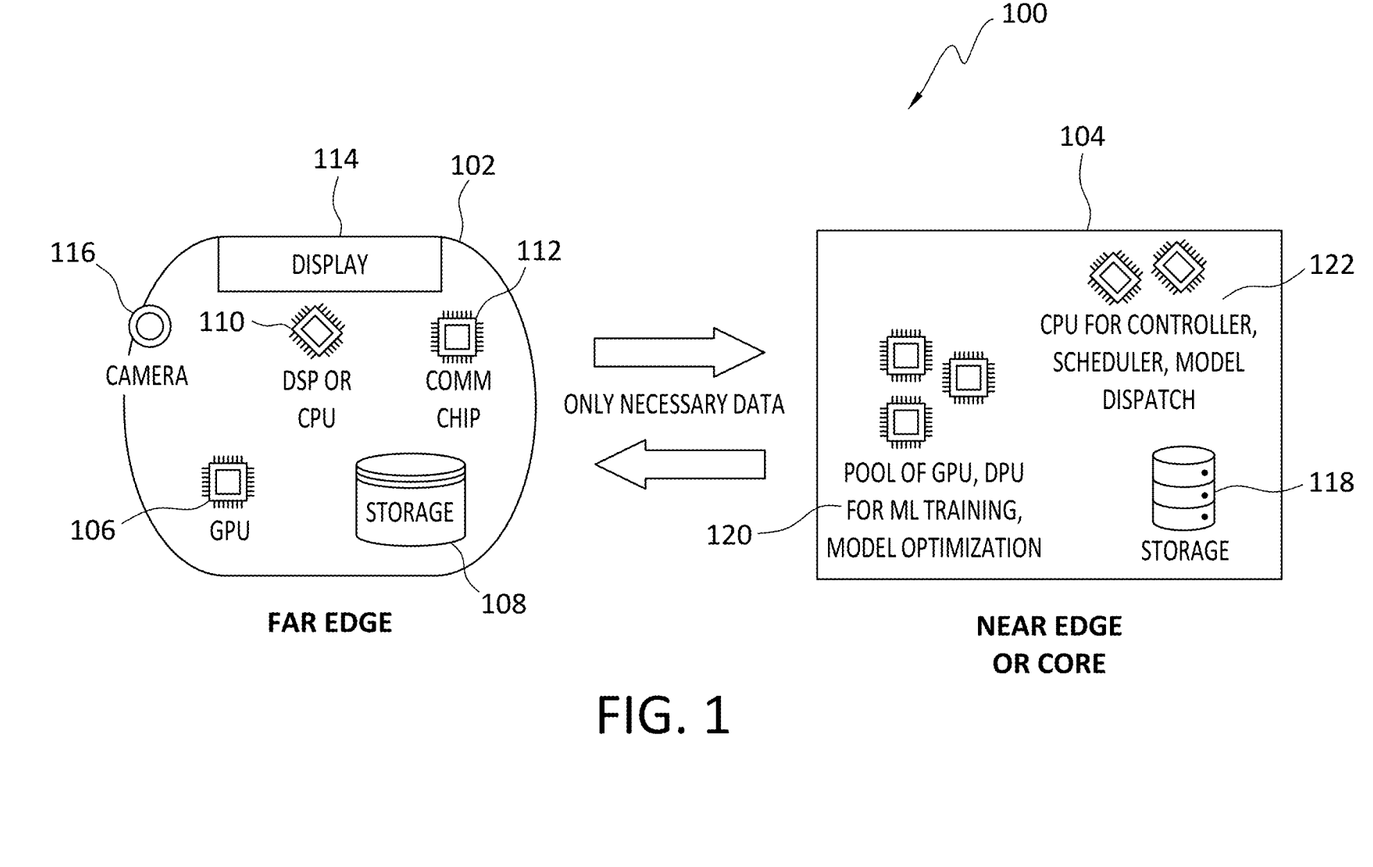
FIG. 1 discloses aspects of an example architecture, according to an embodiment.

With reference now to FIG. 1, an example architecture 100 according to an embodiment is disclosed. In the example of FIG. 1, one or more small form factor image conversion devices (SFFICD) 102 may operate in a far edge computing environment, and may be configured and operable to perform real-time 2D to 3D rendering, and also configured and operable to send/receive data to/from a central system 104 at near edge or core to perform large database, AI/DL training and various control functions as described elsewhere herein.

In one embodiment, the SFFICD 102 may comprise only minimal hardware components, such as a GPU 106 (graphics processing unit) for real time rendering—for example, the 3rd gen RTX chip can deliver real time neural rendering with a single GPU. A portable GPU may also be used to perform rendering at a remote location. In an embodiment, the SFFICD 102 may further comprise a memory card 108 for data storage, a DSP 110 (digital signal processor) or low power CPU 110 (central processing unit) for output controller processing and 3D model comparison, a wireless communication chipset 112 to support WiFi, cellular, satellite, or other wireless, connectivity. The SFFICD 102 may comprise various other components such as, but not limited to, a display 114, an acoustic alarm, and a camera 116.

Among other things, an embodiment of the SFFICD 102 may be configured and operable to generate or render, in real time, a 3D digital model from one or more 2D images, which may be digital. As well, the SFFICD 102 may be configured and operable to obtain 2D images with an onboard camera, and/or to obtain 2D images from an external source.

The SFFICD 102 may perform rendering of a 3D image, from one or more 2D images, in a variety of different ways. For example, an embodiment of the invention may employ Neural Radiation Field (NeRF), and may, in one example, be able to achieve real time view rendering at a speed of 5 fps (frames per second), with a digital resolution of up to 1575×861×1290 while maintaining a file size, in this example, of only 66 MB. Note that the resolution may be defined, for example, by a user, and both the FPS and file size will change with changes in the resolution. If accurate positioning of the camera is performed, more accurate and faster 3D reconstruction can be achieved. Some experimental results obtained by one embodiment are disclosed and discussed elsewhere herein. Using advanced deep learning (DL) techniques, for example, and embodiment may extend the 2D to 3D rendering to achieve various computer vision tasks, as well as 3D modeling acceleration.

The NeRF approach may be more accurate, in some instances at least, than the BIM file reconstruction of 3D space which only reflects structural accuracy from a design point of view, rather than reflecting real world condition such as a cracked surface, deformations, and deteriorated parts. Thus, an embodiment of the invention comprises an anomaly detector which is configured and operable to detect anomalies, such as cracks or deformed component parts of the buildings, to focus on the fine tuning on the region of interests. Note that an 'anomaly' as used herein is not limited merely to problematic conditions, but more broadly, embraces, among other things, a deviation from a normal, expected, or prior, condition. Thus, one embodiment of the invention may comprise a module for generating RGB based heat synthesis images based on environmental factors such as ambient temperature, and materials deployed, and then those heat synthesis images may be converted to 3D heatmaps to help identify areas at risk for fire, chemical reactions, and other problems.

With continued reference to FIG. 1, a central system 104 according to one embodiment may reside at a local office, or near edge location, or a datacenter/cloud where volume storage 118 may be available for hosting necessary historical data for comparison or compliance. The host site for the central system 104 may also comprise a pool 120 of GPUs and/or DPU (data processing unit) that is available for processes such as AI/ML/DL (deep learning) training, 3D model process optimization to reduce rendering and comparison time and compute power at far edge, root cause analysis and progress prediction. In an embodiment, the central system 104 may comprise a multi-core CPU 122 for dataflow control, task scheduler operations, relevant model dispatch operations, and decision making operations, such as operations based on policy and protocol. An embodiment may be configured to minimize, to various extents, the communication of data between the SFFICD 102 and the central system 104, in order to reduce network bandwidth burden, and latency, and to save energy at the SFFICD 102. Thus, an embodiment may be configured and operable to reduce the amount of data transferred between the SFFICD 102 and the central system 104.

C.2 Example Data Flow Operations

Figure 2:
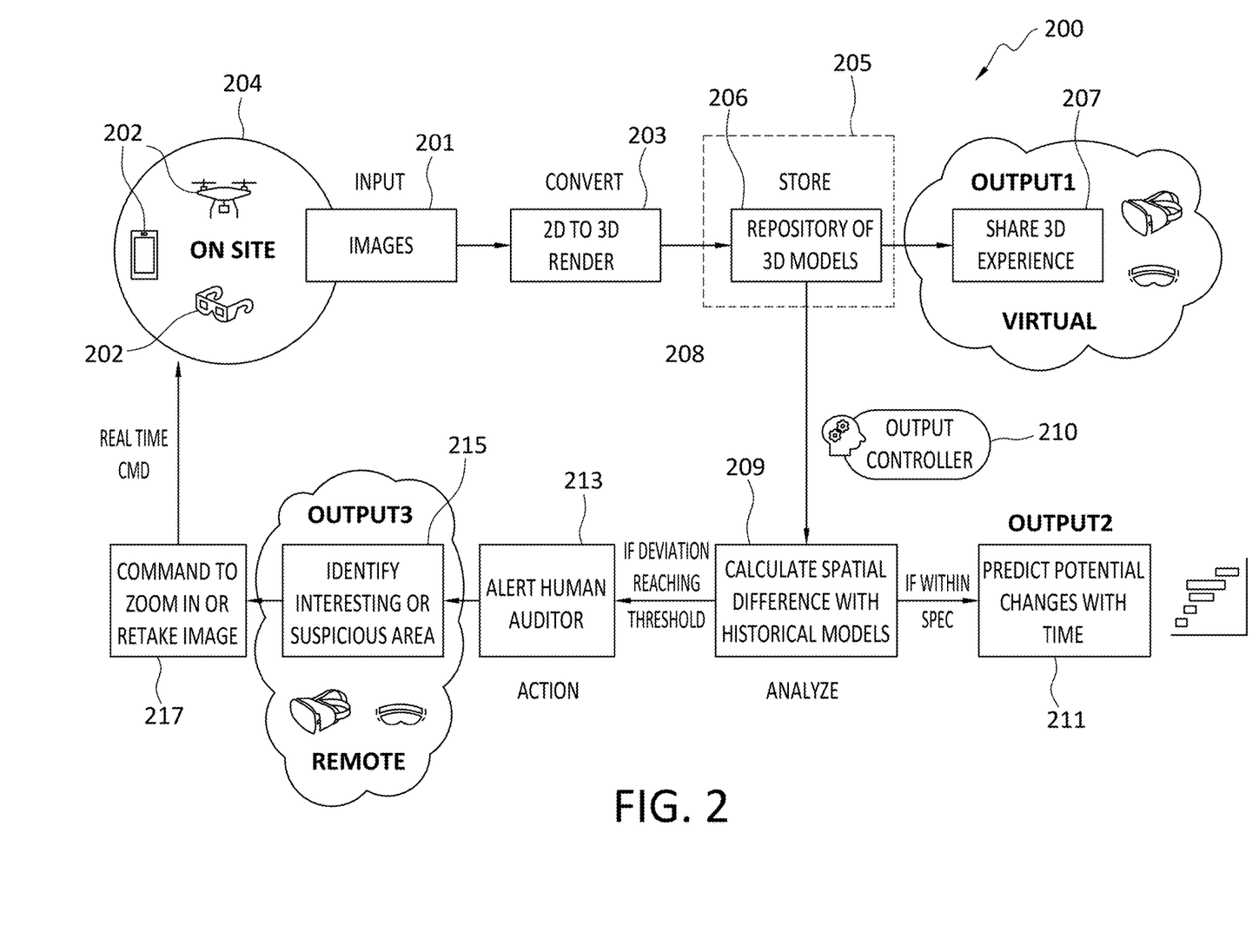
FIG. 2 discloses aspects of example method, including data flow processes, performed in an architecture, according to one embodiment.

With reference next to FIG. 2, details are provided concerning an example method 200, which may comprise various data flow operations, according to one embodiment. In the example of FIG. 2, various entities at various locations may be involved in one or more aspects of a data flow. Thus, a SFFICD 202 may operate at a remote site, or other edge location 204, to capture, or otherwise access, 2D images. As detailed below, these 2D images, however obtained, may be used to generate various outputs.

Initially, and as noted above, the SFFICD 202 may obtain 201 one or more 2D images, which may then be converted, by the SFFICD 202, in real time 203, to a 3D model of the target of the 2D images. Note that as used herein, a 'target' refers to a physical entity, man-made or otherwise, of which one or more 2D images are captured. The 3D model may then be stored 205, such as in a repository 206 of 3D models hosted by a central system 208. In an example consumer use case, the 3D model may be shared 207 with one or more users to enable the users, using VR (virtual reality) goggles and/or comparable equipment, to enjoy a virtual 3D experience, such as an experience of bungee jumping, or flying with a wingsuit, for example. Thus, this shared virtual experience is one example of an output that may be generated using the 3D model. The type of output to be produced, and the data flow for a particular output, may be controlled by an output controller 210 that is configured and operable to communicate with a central system and one or more SFFICDs 202. In an embodiment, the output controller 210 may be hosted by the central system 208, although that is not necessarily required.

In an embodiment, the method 200 may comprise comparing 209 one or more 3D models to each other to enable a calculation of, for example, one or more spatial, and/or other, physical differences between the subjects represented in the 3D models. Differences between the 3D models may be within spec, or acceptable limits, or not. In either case, the differences may be reported. The differences between the 3D models may be used to identify trends in various features of the target such as, for example, an increasing size of a crack in a steel beam. As an example of an output of an embodiment of the invention, such trends may be used to output a prediction 211 of potential changes in the feature over time.

If it is determined at 209 that a difference/delta between 3D models is nearing, has not reached, a defined threshold, an alert may be sent 213 to a human operator and/or other recipient, such as a computing system. Likewise, an alert may be sent if it is determined that the threshold has been exceeded. The alert may indicate, for example, the speed with which the difference is changing, whether the change in the difference has accelerated or not, the nature of the difference, the location of the difference, an extent to which a threshold has been exceeded, and one or more possible remedial actions that may be implemented to slow, stop, or reverse, the change in the difference. By way of illustration, a remedial action may be to weld a crack in a steel beam, while another remedial action may be to replace the steel beam. The remedial actions may, in one embodiment, be ranked in terms of variable such as, but not limited to, time to implement, cost to implement, and expected effective life of the target after the remedial action has been implemented. Where a threshold has been exceeded, the alert may indicate that an affected structure, such as a bridge for example, should be immediately shut down until repairs can be made.

An alert may be analyzed by a human and/or by a computing system, to identify 215 a region of concern or interest (ROI). The identification 215 of the area of concern or interest is another example of an output that may be generated by an embodiment of the invention. In an embodiment, the operations of the method 200 leading up to the identification 215 may be performed in real time so as to enable a user or operator to control, possibly remotely, the SFFICD 202 so that the SFFICD 202 can perform real time actions 217 such as zooming in on an area of interest, retaking a 2D image, and/or other actions. Thus, for example, an alert may indicate that a crack in a beam is growing in size and may not only indicate possible remedial actions, but may also indicate in real time to a human or other entity that additional 2D images may need to be gathered. Thus, alerts may serve as a basis for the performance of near term, and/or long term, actions relating to one or more 3D model differences.

It is noted that as costs for GPUs go down, and power consumption decreases, one or more embodiments may target a wide range of enterprise use cases for processes such as remote inspection and audit, to bring the convenience and efficiency to the daily jobs of many engineers. As another example, an embodiment may equip millions of content creators to bridge the physical and virtual world for better immersive experience.

D. Example Experimental Results

Below are provided two aspects of experimental results to analyze the efficiency and visual quality of using 2D-to-3D methods. In these experiments, NeRF was used as the baseline.

D.1 Efficiency

To measure the efficiency of NeRF, a benchmark may be provided of different NeRF methods on 800×800 images in a synthetic 360 dataset. The results are shown in the Table 300 in FIG. 3.

Figure 3:
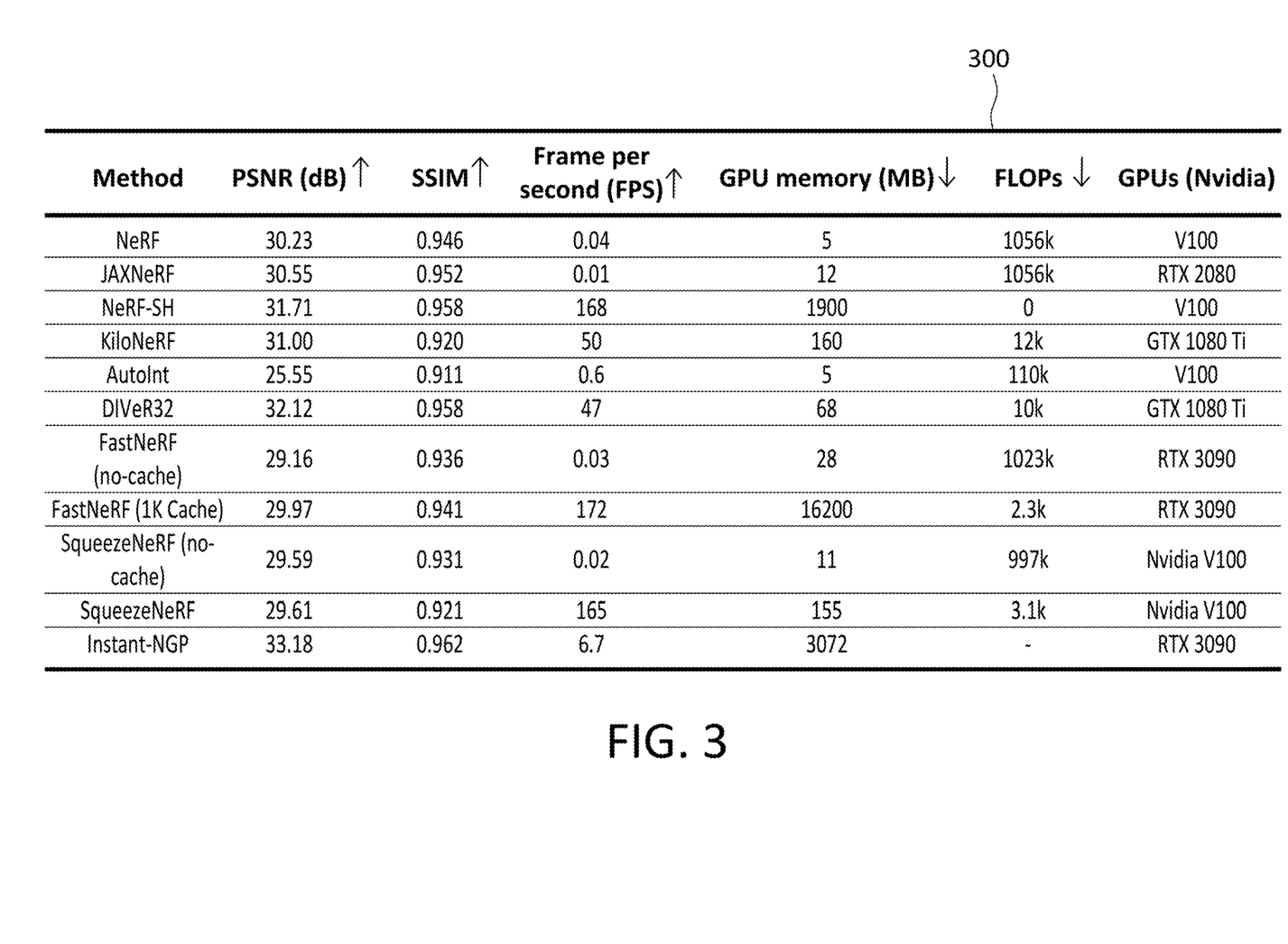
FIG. 3 discloses a table comparing the performance of various 2D-to-3D rendering models.

As a practical matter, humans require an application with frame per second (FPS) over 20. It can be seen in the table 300 that many NeRF variations, such as NeRF-SH, KiloNeRF, DIVeR32, FastNeRF, and SqueezeNeRF, can achieve very high FPS which indicate their real-time computation ability. Given the fact that these approaches can render images up to 800×800 resolution, an embodiment may adaptively reduce the resolution to further speed up the computation, or alternatively may sacrifice speed for higher resolution. Thus, a tradeoff may be made between resolution and speed.

D.2 Visual reconstruction

Figure 4:
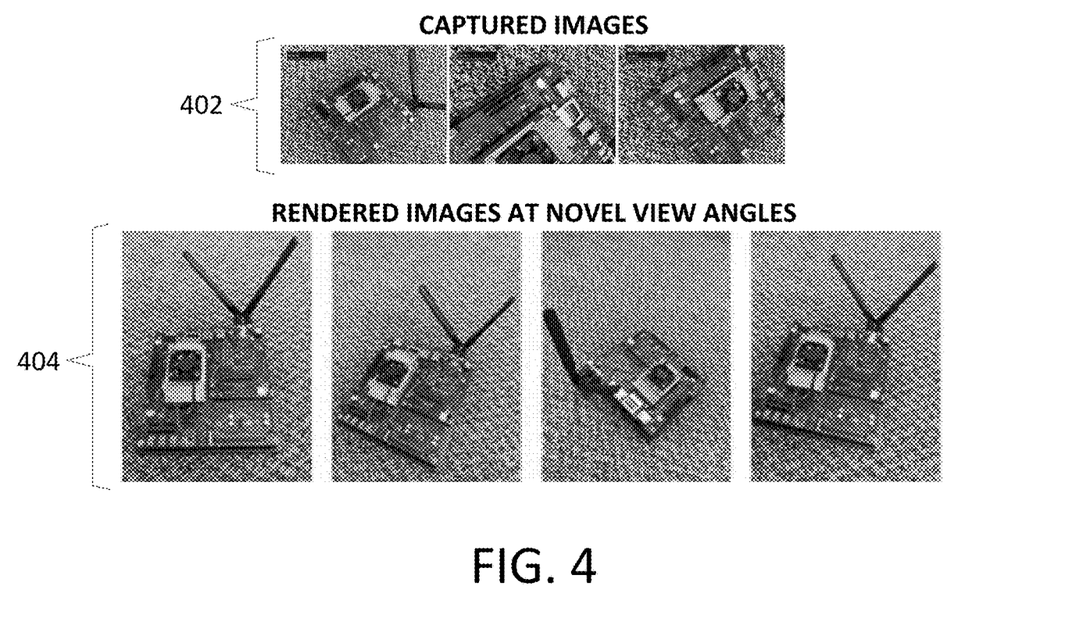
FIG. 4 discloses some example results from the use of Instant-NGP for 3D modeling.

With reference now to FIG. 4, a cellphone was used to capture 30 images 402 of a circuit board. Then Instant-NGP was used to render the images 404 to reconstruct the 3D model. It can be seen in the images 404 that 2D-to-3D rendering is achievable once high-quality 2D images 402 are provided. From FIG. 4, it can be seen that given captured images 402, an embodiment may construct the 3D model of the circuit and render the novel view angles as shown at 404. Here, it can be seen that the details of circuit board are well captured, and may enable users to check the details of the electronic components in the 3D model. This approach may be applied to reconstruct other objects for users to explore different angles of views.

E. Example Use Cases

As noted earlier herein, embodiments of the invention may be employed in a variety of different use cases which may include, but are not limited to, enterprise use cases, and consumer use cases. Examples of each of these are set forth below.

E.1 Enterprise use cases

Example enterprise use cases include, but are not limited to, remote inspection, auditing, quality control, and prediction operations. Industries and applications for these use cases may include industries involving physical infrastructure, such as construction, chemical plant, manufacture, oil, and mining. Some example physical infrastructures may include offshore and onshore oil rigs, tunnels, mines and other underground cites, bridges, railroad tracks, buildings, radio towers, cell towers, and electrical power transmission towers. More generally, any physical structure(s), whether man-made or otherwise, that may require or benefit from periodic inspects and audits, such as may be performed by inspectors on-site, or remotely with a UAV for example, may be a target for an embodiment of the invention.

For example, an embodiment may be used to evaluate structures such as bridges, railroad tracks, and pipe connections in chemical plants. An embodiment may enable 3D remote inspection to quickly examine targets at scale. Anyone at the site may use an embodiment of the invention to perform inspection, and would not necessarily be required to be a highly skilled auditor. Further, unmanned vehicles such as drones may be employed for dangerous and/or inaccessible locations, or locations that are cost-prohibitive to access. If all inspect results are in a 'green' status, approval for the structure that was inspected may be issued onsite, while captured image/video and a rendered 3D model may be uploaded to a central repository when a wired connection is available for a device such as an SFFICD to plug in. If an area of concern, such as an area with a 'yellow' or 'red' status, is identified through real time rendering and comparison, such as surface crack propagation, or chemical pipe leaking, an alert may be issued onsite to trigger additional actions such as requesting a remote auditor for expert review. A remote auditor may send instructions in seconds to direct a drone or on-site person to zoom in or view in a different angle to confirm the point(s) of interest. Meanwhile, an embodiment may additionally, or alternatively, alert an authority for emergency preparation according to a predefined policy or protocol. A wireless communication through WiFi, cellular, or satellite, may be particularly useful in enabling rapid communication between the site and other locations.

E.2 Consumer Use Cases

One example consumer use can for an embodiment of the invention is remote immersive experience sharing. In particular, when a person is traveling to different places, the portable device can render the captured 2D images into 3D model in real time so as to enable the person to share a 3D rendering of his or her environment with family, friends or social network. Further, a viewer with VR goggle would have an immersive experience as if traveling with the experiencer. An embodiment may be employed by, for example, a professional photographer, stargazer, mountain climber, scuba diver, bungee jumper, to create their immersive studio to deliver a real time 3D broadcast to one or more customers or clients. A model compressing feature may be added to the image converter to reduce the network bandwidth requirement for live streaming. The device can be used either in real time or non-real time as many people have photos that they may wish to convert to 3D for immersive experience sharing.

F. Aspects of Some Illustrative Examples

Attention is directed now to various real world circumstances in which an embodiment of the invention may have proved to be useful.

F.1 Bridge Beam Crack

Figure 5A:
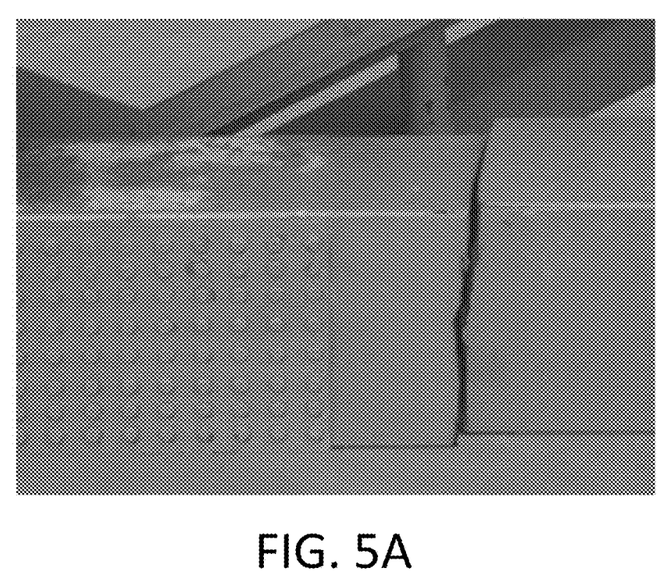
FIG. 5a shows a crack in a steel beam.
Figure 5B:
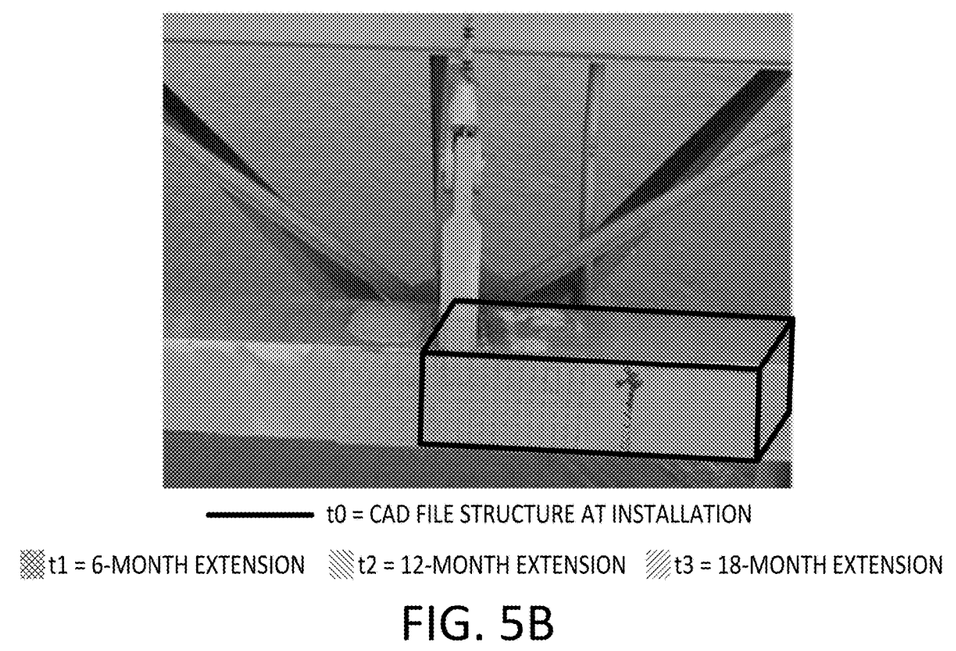

With attention next to FIGS. 5a and 5b, an example of one possible use case for an embodiment of the invention concerns a Mississippi River bridge beam crack (FIG. 5a). The crack in a steel beam forced an emergency three-month shutdown of an Interstate-40 bridge across the Mississippi River in 2021. An embodiment may help to prevent significant service interruptions such as this, thereby possibly saving significant expense, when operations such as those indicated below are performed:

[1] 2D images taken periodically by drone (FIG. 5b) at various times t0, t1, t2, t3;

[2] nearby image converter renders the image to 3D model using technologies such as SfM (Structure from Motion), or NeRF (Neural Radiation Field);

[3] the real-time rendered 3D model may be compared with the original design in CAD file or the image of installation—each follow-on inspection may be compared with prior 3D models rendered from periodical inspection results, and stored in a model repository;

[4] the automatic spatial comparison by the image converter provides quick insights on the real condition of the target without the auditor being onsite;

[5] if the comparison result points to an anomaly, or the deviation reaching a pre-set threshold, the system may automatically alert a human auditor and/or computing system to look at 3D models overlay closely to send commands to remotely direct the drone, or other image capturing system/device, to position a camera to take additional images or zoom in to confirm the severity; and

[6] using AI/ML, the changes of the target along a timeline may be used to help identify a root cause of the observed deformation/failure, to predict progression of the deformation/failure if appropriate action is not taken, and to predict when maintenance or other action should be performed to slow, stop, or reverse, the observed condition.

F.2 Train Track Deformation

A recent heatwave in the UK created a number of emergencies with respect to commuter trains. Particularly, because the steel of the rail track was stress tested at 31° C., while the heatwave caused the local temperature of some tracks to rise as high as 62° C., the track became warped in some locations.

Figure 6:
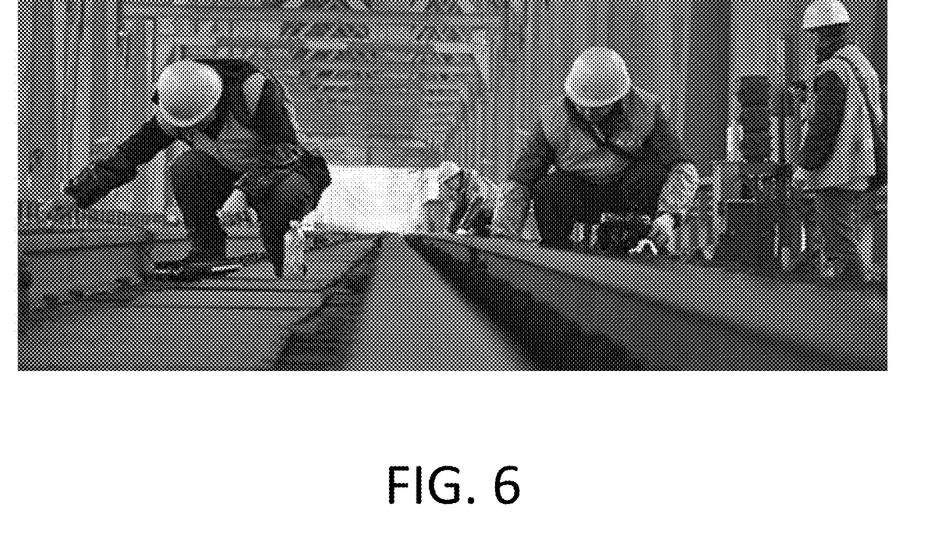
FIG. 6 shows one possible use case for an embodiment.

In an embodiment, a group of drones, rather than human inspectors as shown in FIG. 6, could survey the track and send photos through wireless connection, while a human in a nearby vehicle with as SFFICD could inspect 3D rendered models in real time and compare those 3D models with a CAD model, or the most recent normal inspection results, to determine the severity of the local deformation, and alert the transportation system authorities as to remedial actions that may be taken, where examples of such remedial action may include, but are not limited to:

[1] spray water to cool off the slightly warped track, thus possibly allowing the trains to continue to operation, although possibly at lower speeds—and announce commute delays to the public; and/or

[2] stop the trains in areas where the track is warped to the point of being unable to be safely used, and announce the cancellation of affected trains/routes—also, advise the public as to alternative transportation options such as bus, rideshare, or taxi, for example.

In these example circumstances, an embodiment of the invention may provide relatively fast 2D image acquisition, and initial 3D rendering in low resolution, to deliver anomaly detection in as short a time as a few seconds. This may enable engineers and other personnel to use high resolution rendering to focus only on affected areas, and then quickly identify corrective action to be taken. Such an approach may reduce the likelihood of an accident, while also improving the user experience. Then, when the human inspector returns to a near edge site, such as an office for example, the 3D files from the SFFICD may be uploaded to a central repository and may be used to update the 3D model for the target. The updated 3D model may then be distributed to all SFFICD for use in a subsequent inspection operation.

F.3 Building Collapse

Figure 7A:
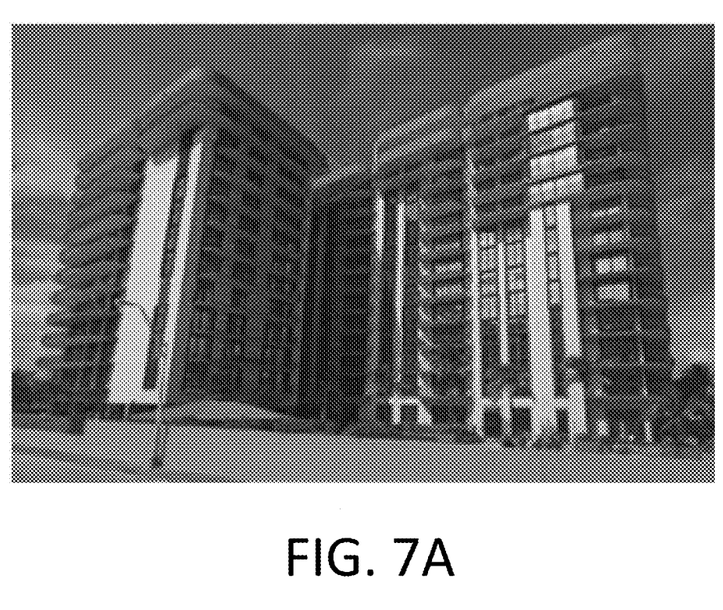
FIG. 7a shows a building prior to collapse.
Figure 7B:
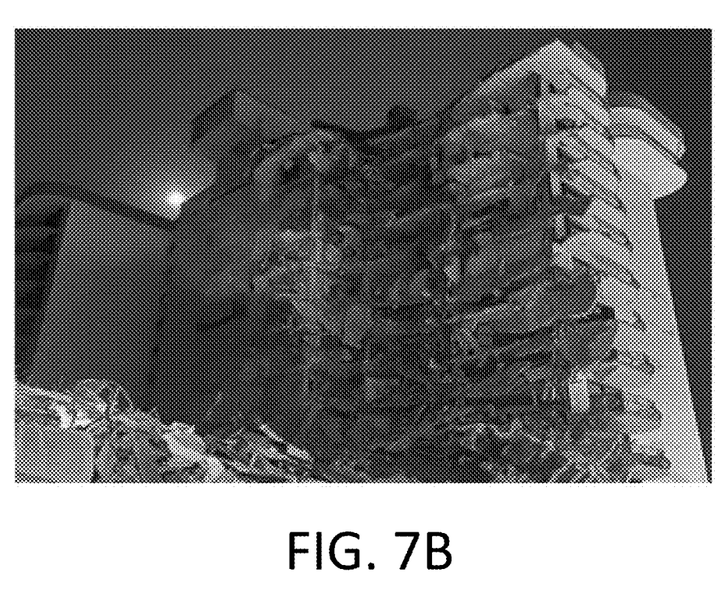
FIG. 7b shows the building of FIG. 7a after collapse.

In June 2021, Champlain Towers South, a 12-story beachfront condominium in Miami, FL collapsed due, it is believed, to a long-term degradation of reinforced concrete structural support, and 99 deaths were attributed to the collapse. FIG. 7a is a picture of the building prior to collapse, in 2015, and FIG. 7b is a picture of the building after it collapsed in 2021. These circumstances suggest another possible use case for an embodiment of the invention.

Particularly, an SFFICD may be used by an inspector to create a 3D model of current conditions, based on recent 2D images of the target, and to compare the new 3D model with previously rendered 3D models of various structures, such as the basement, parking garage, and pool deck. Delta analytics, comprising differences between the new, and previously created, 3D models may then be used by AI/ML techniques, for example, to identify areas classified as 'green,' 'yellow,' or 'red,' as well as to make predictions as to when, for example, a structure might be expected to fail. All of these operations may be performed in real time as an inspector is performing an inspection of the structures. The analytics and predictions may be used to identify remedial actions, such as steel/concrete replacement or reinforcement that should be taken before any significant problems occur.

G. Example Methods

It is noted with respect to the disclosed methods, including the example method of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

H. Further Example Embodiments

Following are some further example embodiments of the invention. These are presented only by way of example and are not intended to limit the scope of the invention in any way.

Embodiment 1. A method, comprising: obtaining a group of two dimensional images of a target; rendering, in real time immediately after the two dimensional images are obtained, a three dimensional model of the target, using the two dimensional images; and generating an output comprising the three dimensional model.

Embodiment 2. The method as recited in embodiment 1, wherein the output is shared with a group of users and the output enables the users to have an immersive three dimensional experience when the output is received at the users by a virtual reality device.

Embodiment 3. The method as recited in any of embodiments 1-2, further comprising comparing the three dimensional model with a previously generated three dimensional model of the target and, based on the comparing, identifying a difference in a physical condition of an element of a physical structure of the target, the difference having occurred between a time when the previously generated three dimensional model was created and a time when the three dimensional model was created.

Embodiment 4. The method as recited in embodiment 3, further comprising, predicting, based in part on the difference in the physical condition, when the element is likely to fail.

Embodiment 5. The method as recited in embodiment 3, further comprising identifying a remedial action corresponding to the difference.

Embodiment 6. The method as recited in embodiment 3, further comprising generating and transmitting an alert when the difference has reached a specified threshold.

Embodiment 7. The method as recited in embodiment 3, wherein the difference is part of an identified trend in the physical condition of the element.

Embodiment 8. The method as recited in any of embodiments 1-7, wherein obtaining the group of two dimensional images comprises using a camera of a small form factor image conversion device to capture the two dimensional images.

Embodiment 9. The method as recited in any of embodiments 1-8, wherein the obtaining of the group of two dimensional images is performed by a small form factor image conversion device in response to remote commands.

Embodiment 10. The method as recited in embodiment 9, wherein the two dimensional images are obtained in real time as the remote commands are received by the small form factor image conversion device.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

1. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
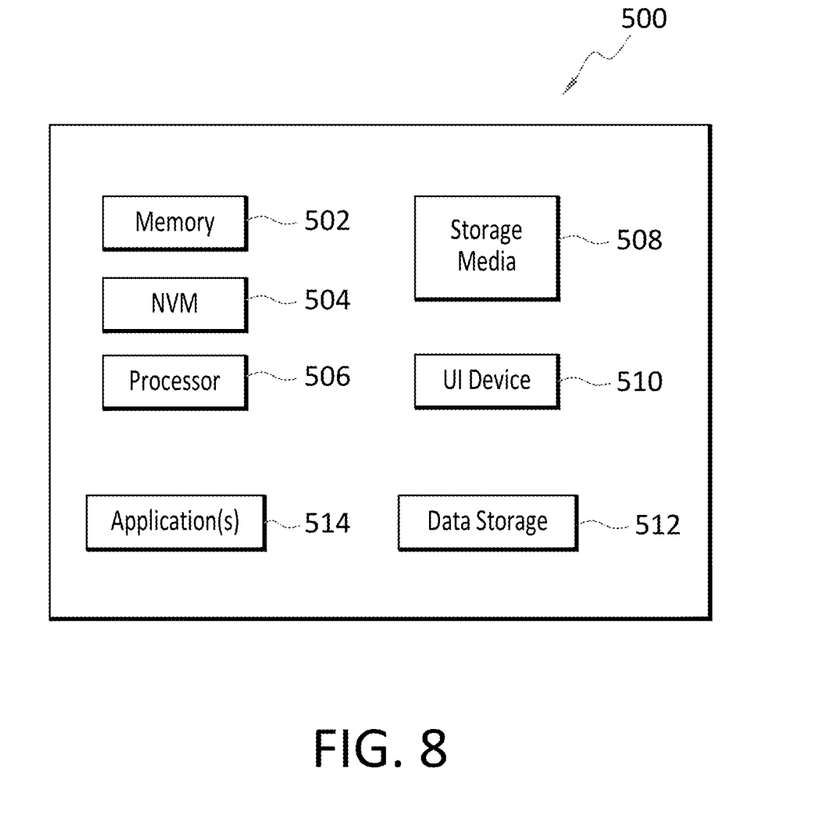
FIG. 8 discloses aspects of an example computing device configured and operable to perform any of the disclosed methods, processes, and operations.

With reference briefly now to FIG. 8, any one or more of the entities disclosed, or implied, by FIGS. 1-7, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 8.

In the example of FIG. 8, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

obtaining a group of two dimensional images of a target;

rendering, in real time immediately after the two dimensional images are obtained, a three dimensional model of the target, using the two dimensional images;

generating an output comprising the three dimensional model;

comparing the three dimensional model with a previously generated three dimensional model of the target; and based on the comparing, identifying a difference in a physical condition of an element of a physical structure of the target, the difference having occurred between a time when the previously generated three dimensional model was created and a time when the three dimensional model was created, wherein the three dimensional model and the previously generated three dimensional model have a lower resolution than a high resolution three dimensional model, which can be generated based on the two dimensional images.

2. The method as recited in claim 1, wherein the output is shared with a group of users and the output enables the users to have an immersive three dimensional experience when the output is received at the users by a virtual reality device.

3. The method as recited in claim 1, further comprising, predicting, based in part on the difference in the physical condition, when the element is likely to fail.

4. The method as recited in claim 1, further comprising identifying a remedial action corresponding to the difference.

5. The method as recited in claim 1, further comprising generating and transmitting an alert when the difference has reached a specified threshold.

6. The method as recited in claim 1, wherein the difference is part of an identified trend in the physical condition of the element.

7. The method as recited in claim 1, wherein obtaining the group of two dimensional images comprises using a camera to capture the two dimensional images.

8. The method as recited in claim 1, wherein the obtaining of the group of two dimensional images is performed by a small form factor image conversion device in response to remote commands.

9. The method as recited in claim 8, wherein the two dimensional images are obtained in real time as the remote commands are received by the small form factor image conversion device.

10. A non-transitory storage medium having stored therein instructions that are executable by one or more hardware processors to perform operations comprising:
    obtaining a group of two dimensional images of a target;
    rendering, in real time immediately after the two dimensional images are obtained, a three dimensional model of the target, using the two dimensional images;
    generating an output comprising the three dimensional model;
    comparing the three dimensional model with a previously generated three dimensional model of the target; and
    based on the comparing, identifying a difference in a physical condition of an element of a physical structure of the target, the difference having occurred between a time when the previously generated three dimensional model was created and a time when the three dimensional model was created,
    wherein the three dimensional model and the previously generated three dimensional model have a lower resolution than a high resolution three dimensional model, which can be generated based on the two dimensional images.

11. The non-transitory storage medium as recited in claim 10, wherein the output is shared with a group of users and the output enables the users to have an immersive three dimensional experience when the output is received at the users by a virtual reality device.

12. The non-transitory storage medium as recited in claim 10, wherein the operations further comprise, predicting, based in part on the difference in the physical condition, when the element is likely to fail.

13. The non-transitory storage medium as recited in claim 10, wherein the operations further comprise identifying a remedial action corresponding to the difference.

14. The non-transitory storage medium as recited in claim 10, wherein the operations further comprise generating and transmitting an alert when the difference has reached a specified threshold.

15. The non-transitory storage medium as recited in claim 10, wherein the difference is part of an identified trend in the physical condition of the element.

16. The non-transitory storage medium as recited in claim 10, wherein obtaining the group of two dimensional images comprises using a camera of a small form factor image conversion device to capture the two dimensional images.

17. The non-transitory storage medium as recited in claim 10, wherein the obtaining of the group of two dimensional images is performed by a small form factor image conversion device in response to remote commands.

18. The non-transitory storage medium as recited in claim 17, wherein the two dimensional images are obtained in real time as the remote commands are received by the small form factor image conversion device.

19. The method as recited in claim 1, wherein the three dimensional model and the previously generated three dimensional model are generated based on the two dimensional images quicker than the high resolution three dimensional model.

20. The non-transitory storage medium as recited in claim 10, wherein the three dimensional model and the previously generated three dimensional model are generated based on the two dimensional images quicker than the high resolution three dimensional model.

* * * * *